United States Patent [19]

McDuffee, Sr.

[11] 3,788,734

[45] Jan. 29, 1974

[54] FENDER MOUNTED REAR VIEW MIRROR

[76] Inventor: Paul E. McDuffee, Sr., 306 23rd Ave. West, Bradenton, Fla. 33505

[22] Filed: Sept. 8, 1972

[21] Appl. No.: 287,252

[52] U.S. Cl. ................. 350/289, 350/7, 74/501 M
[51] Int. Cl. .............................................. G02b 5/08
[58] Field of Search... 350/288, 289, 285, 6, 7, 304, 350/307; 74/501 M

[56] References Cited
UNITED STATES PATENTS

| | | | |
|---|---|---|---|
| 3,609,014 | 9/1971 | Kurz, Jr. | 350/289 |
| 3,575,496 | 4/1971 | Pollock | 350/289 |
| 3,166,283 | 1/1965 | Farnsworth | 350/307 |
| 3,610,736 | 10/1971 | Bateman | 350/307 |
| 3,459,470 | 8/1969 | Hahn | 350/289 |
| 3,628,862 | 12/1971 | Stephenson | 350/289 |

*Primary Examiner*—Ronald L. Wibert
*Assistant Examiner*—Michael J. Tokar

[57] ABSTRACT

A fender mounted rear view mirror for an automotive vehicle, which is tiltingly adjusted about either of two coordinate axes in consequence of selective energization of two electric motors controlled by switches located in the driver's compartment of the vehicle. Each of the motors is drivingly connected through reduction gearing with a rotary actuating member; and rotary motion of each actuating member is translated into tilting adjustment of the mirror about one of said axes through a pitman having one end eccentrically connected with the actuating member and its other end connected to the back of the mirror.

20 Claims, 9 Drawing Figures

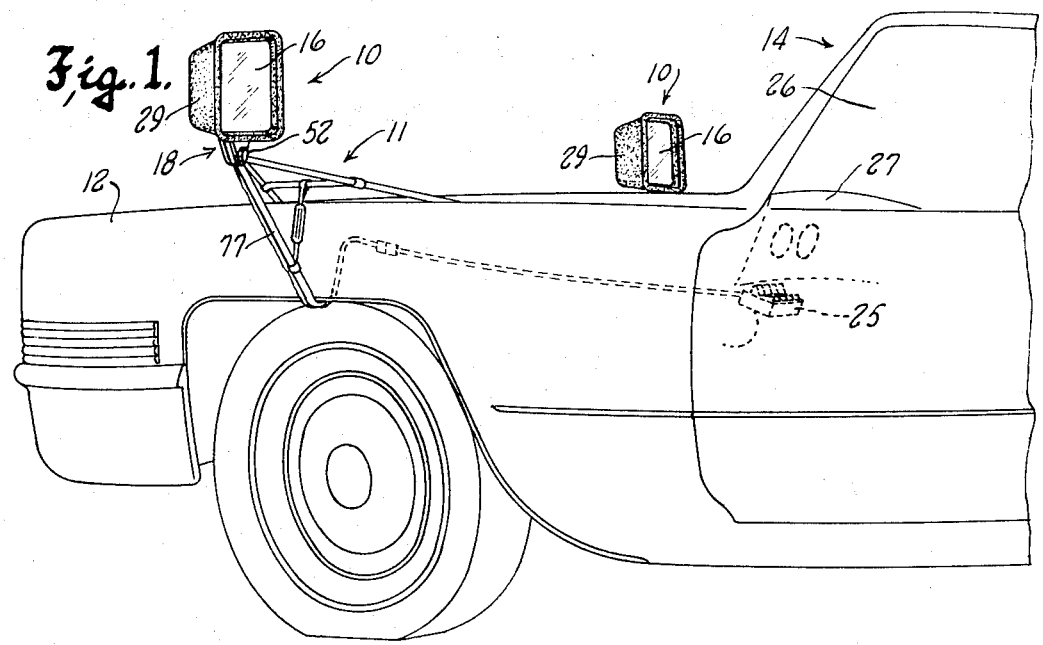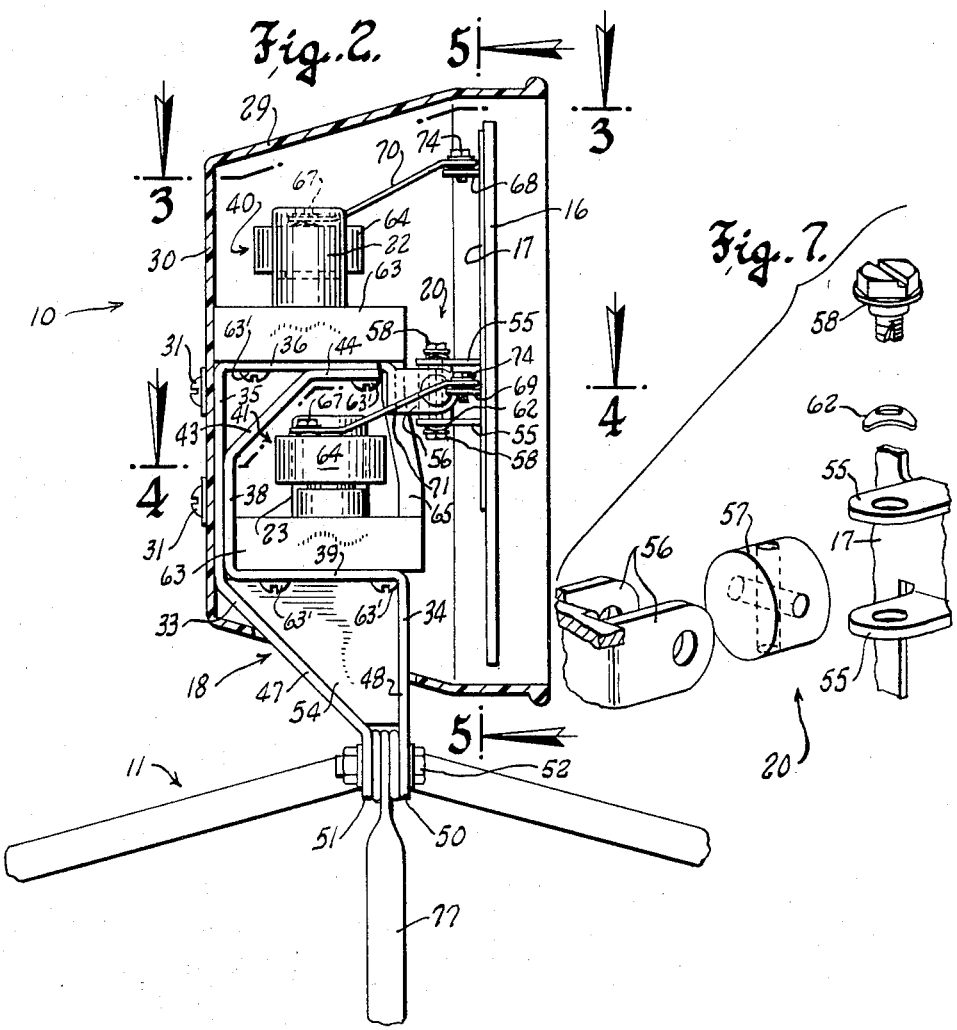

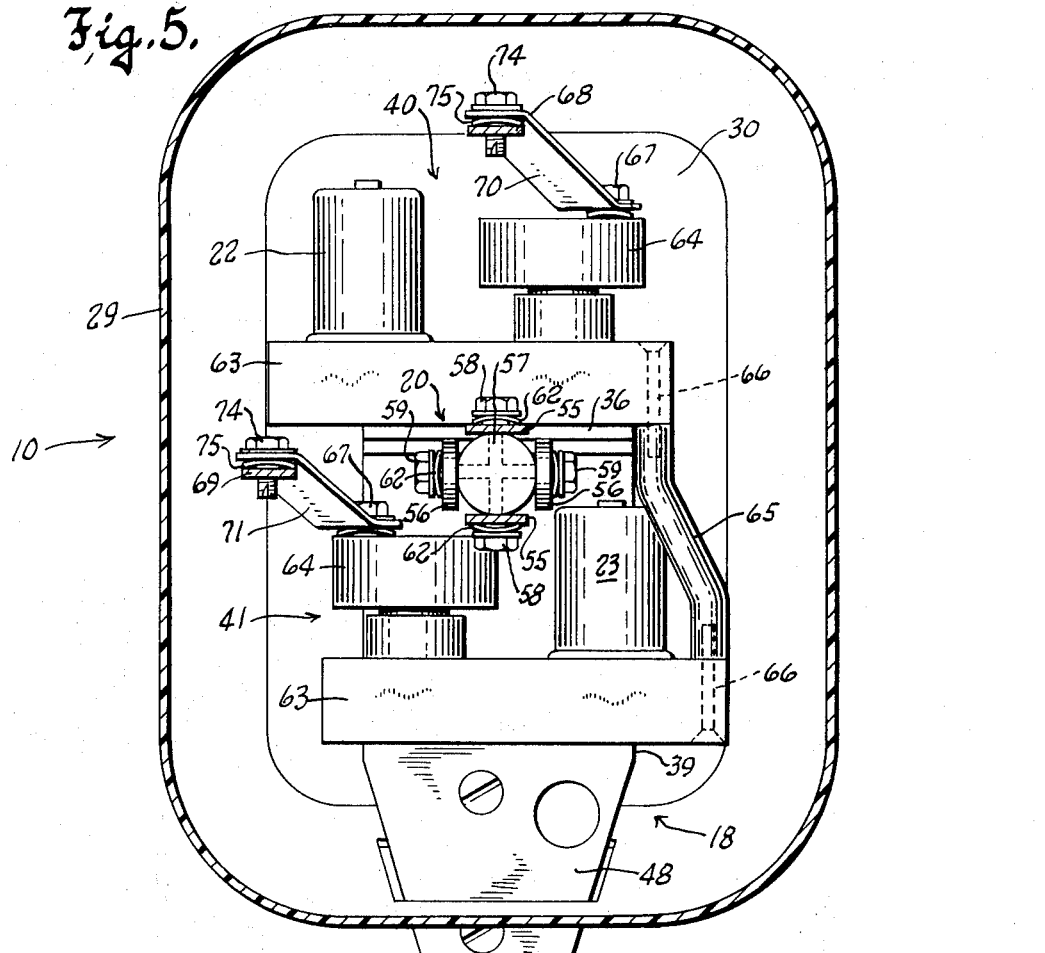
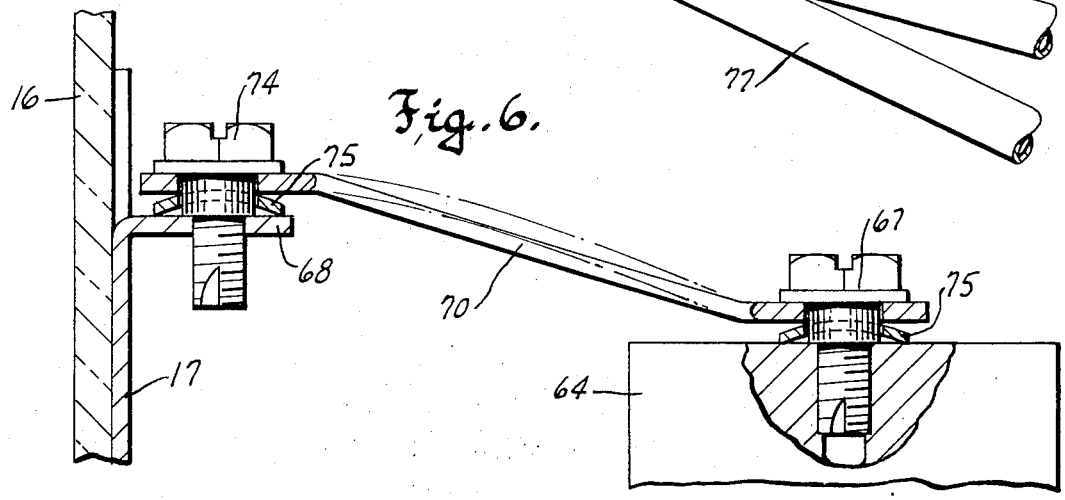

FENDER MOUNTED REAR VIEW MIRROR

This invention relates to rear view mirrors for automotive vehicles, and has more particular reference to outrigger mounted rear view mirrors such as those secured to the front fenders of automobiles (or trucks) to enable the drivers thereof to see the roadway alongside of and behind substantially large trailer bodies towed by the vehicles.

In general, this invention has as its objectives the provision of a rear view mirror of the character described which can be tiltingly adjusted with ease by an operator of the vehicle, from the passenger compartment thereof; and which features simplicity and low cost of manufacture without sacrifice of the rugged qualities essential to the elimination of vibration during operation of the vehicle over rough roads.

More specifically it is a purpose of the invention to provide electric motor driven means for effecting tilting adjustment of the mirror about either of two coordinate axes under the control of electrical switch means accessible to an operator of the vehicle in the drivers compartment thereof.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate one complete example of an embodiment of the invention constructed according to the best mode so far devised for the practical application of the principles thereof, and in which:

FIG. 1 is a perspective view of the front portion of an automobile equipped with two of the fender mounted rear view mirrors of this invention, one on each front fender;

FIG. 2 is a cross sectional view through the mirror assembly seen in FIG. 1;

FIG. 5 is a sectional view taken on the line 5—5 in FIG. 2;

FIG. 6 is a detail view on an enlarged scale, showing the driving connection between the back of the mirror and one of a pair of motor driven actuators by which adjustment of the mirror is effected;

FIG. 7 is an exploded perspective view of the mirror mounting structure;

Figure 3:
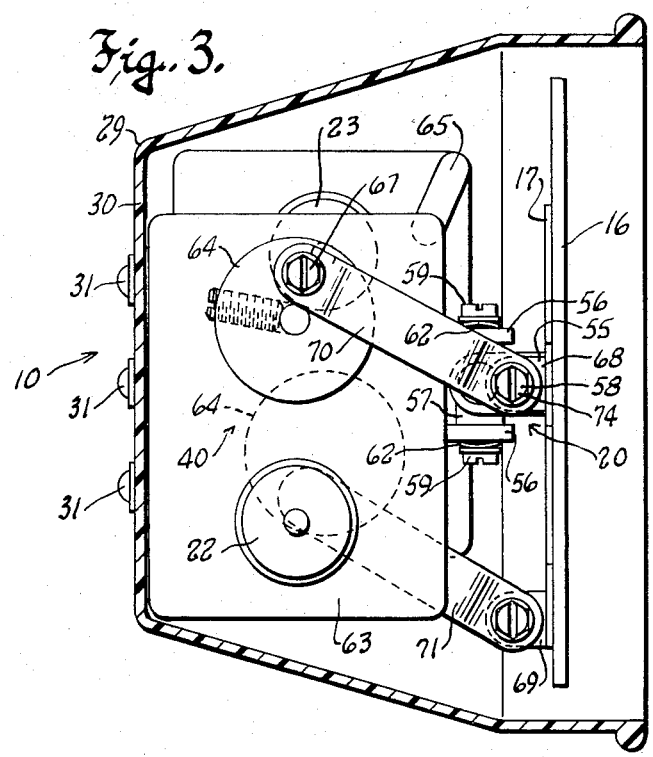
FIG. 3 is a sectional view taken on the line 3—3 in FIG. 2.
Figure 4:
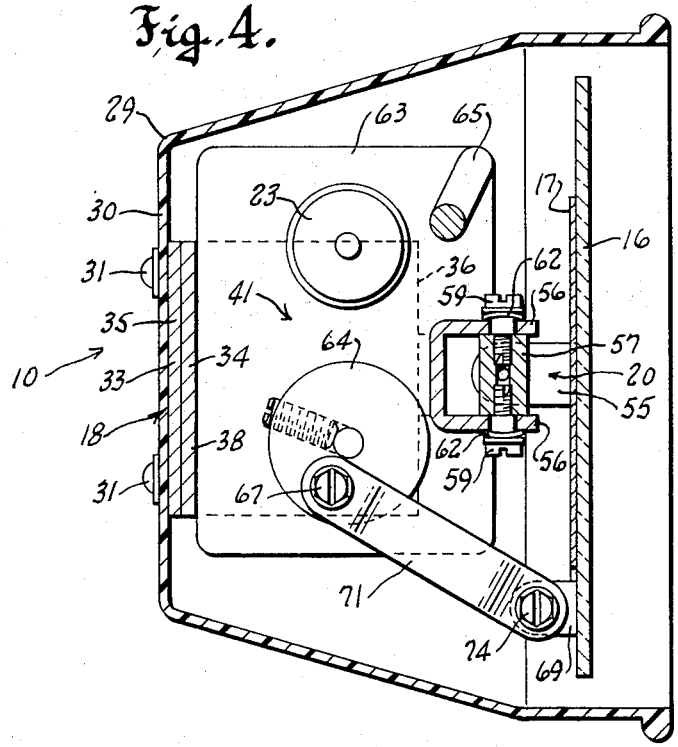
FIG. 4 is a sectional view taken on the line 4—4 in FIG. 2.
Figure 8:
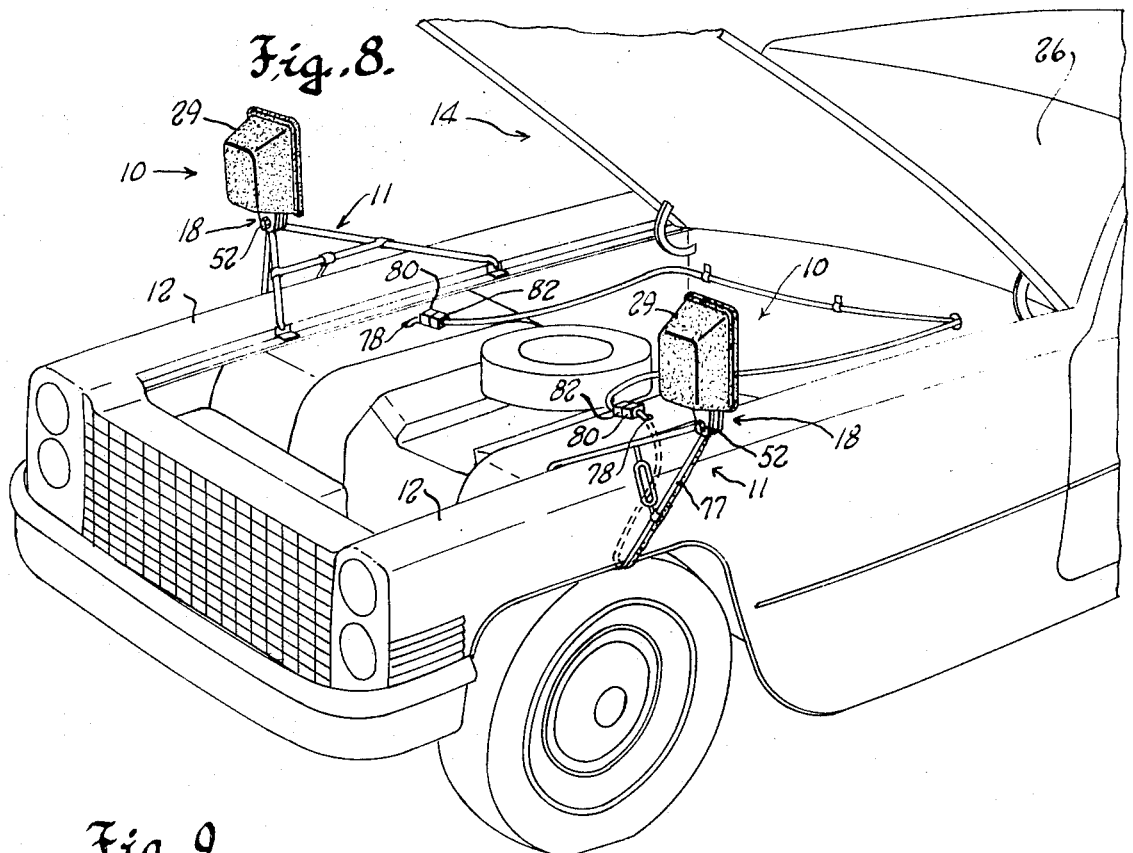
FIG. 8 is a perspective view of the front end portion of the automobile with its hood up to show how plug and socket connected leads facilitate connecting the mirror adjusting drive motors into energizing circuits that are controlled by switch means in the passenger compartment of the vehicle.

Referring now to the accompanying drawings, the numeral 10 generally designates a rear view mirror assembly of this invention mounted in outrigger fashion by a tripod bracket 11 of conventional construction on one, but preferably both front fenders 12 of an automotive vehicle 14, here shown as a passenger automobile.

The mirror assembly comprises a mirror 16 having a mounting plate 17 secured flatwise to its rear, and a supporting structure 18 which is rigidly secured to the outer convergent ends of the tripod bracket 11 and projects upwardly therefrom. The mirror is mounted on the supporting structure 18 by means of a gimbal joint 20 which provides a pair of coordinate horizontal and vertical axes about which the mirror can be tilted up and down and from side to side.

A pair of reversible electric motors 22 and 23 mounted on the supporting structure are drivingly connected with the mirror in a manner to be described to provide for tilting the same in either direction about either of said coordinate axes at the command of electrical switch instrumentabilities 25 located in the passenger compartment 26 of the vehicle and preferably supported on the instrument panel 27 thereof at a location readily accessible to the operator of the vehicle.

A more detailed description of the mechanism outlined above will now be presented.

The mirror assembly 10 includes a panlike housing 29 having its open side facing rearwardly and its bottom wall 30 secured to the supporting structure 18 by screws 31.

The housing thus protectively encloses the mirror and its supporting structure 18, with the mirror extending across the open side of the housing and the supporting structure 18 between the mirror and the bottom wall of the housing.

The supporting structure 18 features an unusual degree of rigidity, and comprises a weldment consisting of a pair of inner and outer brackets 33 and 34, respectively, both fabricated from metal plate stock. The inner bracket 33 has a flat back portion 35 to which the bottom wall 30 of the housing is flatwise secured by the aforesaid screws 31, and has an upper horizontal ledge or shelf 36 projecting from the top thereof to extend toward the open side of the housing at a level near its center.

The outer bracket 34 also has a flat back portion 38 which flatwise overlies the corresponding portion of the inner bracket and is welded thereto along its edges. A lower horizontal ledge or shelf 39 projects from the back portion 38, at a level near the bottom of the housing. The ledges 36 and 39 provide supports for upper and lower power drive units 40 and 41, respectively, which include the electric motors 22 and 23.

The upper ledge or shelf 36 is reinforced by a strut or brace 43 which forms part of the outer bracket, and which extends diagonally across the underside of the upper corner of the inner bracket. The outer end portion 44 of this brace is horizontal and is flatwise secured to the underside of the upper shelf 36 by being welded thereto.

In order to provide for securement of the supporting structure to the convergent outer ends of the legs on the tripod 11, each of the inner and outer brackets 33 and 34 has legs, 47 and 48, respectively which are bent downwardly toward the outer end of the tripod. The leg 48 on the outer bracket is bent downwardly from the lower shelf 39, to extend substantially vertically from the outer end of the shelf at a zone just a bit to the rear of the center of the housing. Its opposite side edges converge toward the bottom of the leg as seen in FIG. 5 and terminate in a centrally apertured jaw 50.

The other leg 47 extends downwardly from the bottom of the back portion 38, in convergent relation to the leg 48, and its opposite side edges also converge toward a centrally apertured jaw 51 which is spaced from the jaw 50 a distance to receive the flatted ends of all three of the tripod legs. The jaws 50 and 51 which are parallel to one another and to the leg 48 on the outer bracket, are drawn together to clamp the flattened ends of the tripod legs therebetween, by a single bolt 52 passing through aligned apertures in the jaws and in the leg ends embraced thereby.

With the described construction of the supporting structure 18, it will be noted that the diagonally disposed leg 47 of the inner bracket also provides a brace for the outer leg 48, and additional rigidity is achieved by welding a gusset plate 54 edgewise between the legs 47 and 48.

The gimbal joint 20 by which the mirror is tiltably mounted on the supporting structure, comprises a pair of parallel flat upper and lower flanges 55 projecting from the mirror mounting plate 17, a similar pair of side flanges 56 which lie in vertical planes and are provided by a U-shaped member that is formed out of the same stock as the upper shelf 36, and a cylindrical disc 57 edgewise embraced by and pivotally connected to both pairs of flanges by self tapping shouldered screws 58 and 59.

The screws 58 and 59 are threadedly secured in pairs of coaxial holes in the edge of the cylindrical disc 57 at locations 90° apart. Accordingly the shouldered portions of the screws 58 which are freely rotatably received in coaxial bearing holes in the flanges 55 provide journals about which the mirror can be swung from side to side, and the shouldered portions of the screws 59 which are similarly received in bearing holes in the flanges 56 provide journals about which up and down tilting adjustment of the mirror can be effected. Curved spring washers 62 take up the axial play in the aforesaid pivotal connections of the gimbal joint.

As mentioned earlier, tilting adjustment of the mirror is effected by driver controlled energization of the motors 22 and 23 which provide prime movers for the power drive units 40 and 41. Each of these drive units, in addition to its motor, includes reduction gearing (not shown) contained within a generally rectangular housing 63 with flat top and bottom walls and a disc-like actuating member or crank 64 driven from the output shaft of the reduction gearing. The gear housings of the two drive units are horizontally seated upon and solidly secured to the ledges 36 and 39 by screws 63', and the motors and the disc-like actuating members are mounted on the top wall of the gear housings.

The motor 22 of the lower drive unit 41 and its associated actuating member 64, are thus located in the space beneath the upper shelf 36. The power drive units 40 and 41 are identical but are mounted in endwise reverse orientation, so that their motors are at opposite sides of the total assembly to conserve space and achieve compactness.

Since rigidity of the entire assembly is essential to the prevention of vibration, the two gear housings 63 are solidly connected, not only by virtue of their being fixed to the supporting structure 18, but also by a stiff strut 65. As shown in FIG. 5 this strut spans the distance between the gear housings 63 and is secured to both by screws 66 which pass through the housings to be threaded into the ends of the strut.

Also with a view to reducing the possibility of vibration, the center of gravity of the total assembly including the mirror and the housing is substantially in line with its point of connection to the tripod bracket 11.

From the description thus far taken with the portions of the drawings to which it pertains it will be understood that the mirror can be secured to the mounting plate 17 in any suitable fashion, as for instance by cementing the back thereof to the mounting plate; and that the gimbal joint mounts the mirror at a location spaced a distance inwardly from the open side of the pan-like housing.

It is significant to note that all edge portions of the mirror are spaced from the surrounding walls of the housing, and that no weather seal is employed to prevent rain from gaining access to the interior of the housing through the space around the mirror edges. This inexpensive construction for the mirror assembly is made possible by reason of the fact that the electric motors 22 and 23 as well as the gear housings are of the permanently sealed moisture-proof type.

Each of the actuating members or cranks 64 turns about an upright axis and carries an eccentric 67 in the form of a shouldered self tapping screw projecting from its upper face.

The described mounting of the actuating members or cranks 64 disposes the crank of the lower drive unit 41 at an elevation near the midportion of the mirror, and disposes the crank of the upper drive unit 40 at an elevation near the upper edge of the mirror.

Centrally located on the back of the mirror at its upper edge is a first flat centrally apertured lug 68, bent from a portion of the mirror mounting plate 17 and lying in a plane normal to the vertical axis about which the mirror can tilt. Also centrally located on the back of the mirror but adjacent to that side thereof which is opposite the crank 64 of the lower drive unit 41, is a second flat centrally apertured lug 69. The lug 69 is similarly bent out of the mirror mounting plate 17, and is parallel to the first lug 68.

A first pitman 70 is connected between the eccentric 67 on the crank of the upper drive unit and the upper lug 68 on the mirror, and a second pitman 71 is connected between the eccentric on the crank of the lower drive unit and the side mounted lug 69 on the mirror. Accordingly, rotary motion of the upper crank 64 is translated into up and down tilting motion about a horizontal axis fixed with respect to the supporting structure 18, due to the alternate pushing and pulling action of the pitman 70 on the mirror carried lug 68 as the crank rotates. Similarly, rotary motion of the lower crank is translated into side-to-side tilting of the mirror about an upright axis fixed with respect to the mirror.

By virtue of the described manner of connecting the mirror with the two drive units, their motors can be kept running without damage. In other words, there are no limits to the motor produced rotation of the actuators, which if present, would stall and damage the motors if they were unintentionally kept energized.

Figure 9:
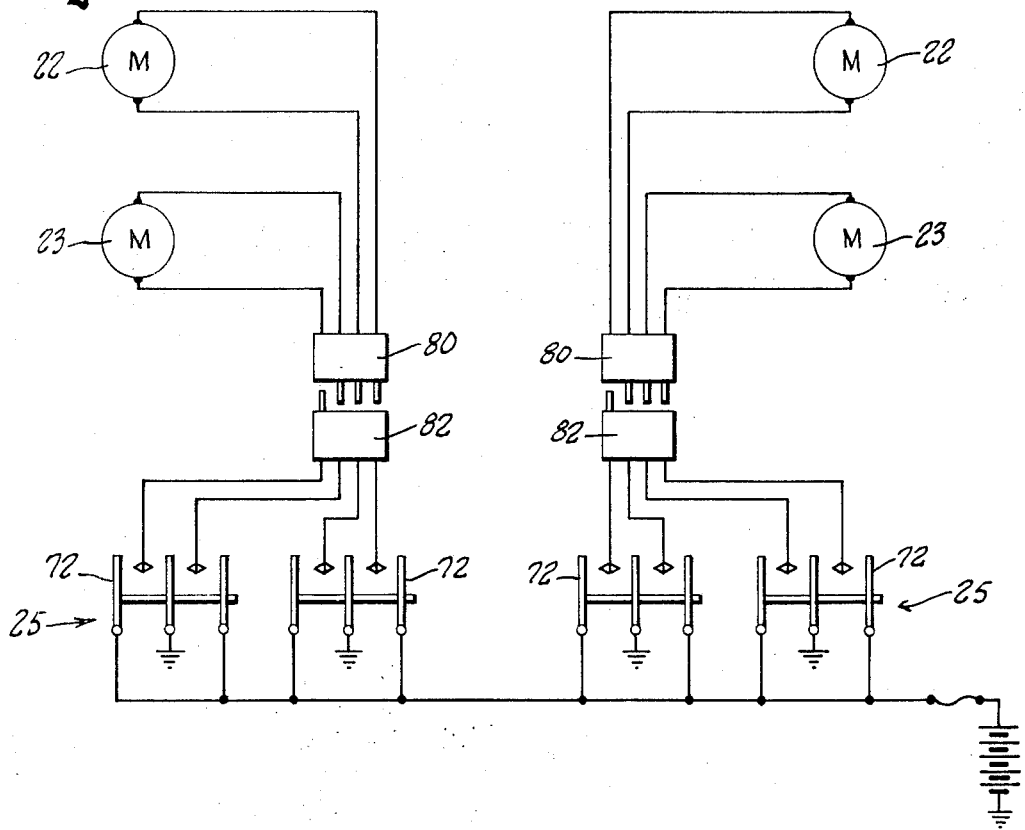
FIG. 9 is a wiring diagram of those circuits.

As indicated in FIG. 9, the motor controlling switch means comprises a reversing switch 72 for each electric motor, so that the operator can start the motor driven tilting action of the mirror about either of its coordinate axes, and then reverse the direction of tilt at any time, in the event of overtravel of the mirror beyond its desired position of adjustment.

It should be noted that each pitman has a flat inner end portion which overlies the upper face of its crank and is pivoted on the eccentric 67 thereof, and a flat outer end portion which overlies one of the mirror carried lugs 68 – 69 and is pivoted thereto by a shouldered self tapping screw 74. The eccentric 67 is also a shouldered self tapping screw which passes through a bearing hole in the pitman and is threadedly fixed in the crank.

The use of shouldered screws to connect the ends of the pitmans with the cranks and with the mirror takes advantage of the simplicity of a pivot pin type connection as distinguished from the more expensive and less reliable ball and socket type connection. But pivot pin type connections constrain the connected parts to relative rotation about an axis, whereas ball and socket joints do not so limit relative motion between the connected parts. The substitution of pivot pin type connections for ball and socket joints — that are conventionally used where the connections must accommodate movement of the connected parts about a point rather than an axis, despite the noted seeming objection thereto — is made possible through the provision of flexibility in the motion transmitting connections between the cranks and the mirror. Specifically, this flexibility is achieved by the simple expedient of making the pitmans 70 and 71 in the form of flat spring-like members having good motion transmitting characteristics but which nevertheless can flex and twist as the mirror tilts. Such flexure of the pitman is indicated in broken lines in FIG. 6.

As shown best in FIG. 6, the flat apertured end portions of the pitmans are thinner than the lengthwise dimension of the journals provided by the shouldered screws. This prevents binding, but results in freedom of the pitman ends to move axially of the journals. To guard against the possibility of rattling due to this freedom, a curved spring washer 75 is confined between the underside of the pitman and the top of the lugs 68–69 and the actuating member 64.

The substitution of the described gimbal joint 20 for the conventionally used ball and socket connection between the mirror and its supporting structure, not only has the advantage of constraining the mirror to tilting about defined coordinate axes, but as in the case of the connections between the cranks and the mirror is in keeping with the primary objective of the invention — to provide a rugged, reliable and simple structure capable of achieving instantaneous adjustment of the mirror.

Because there are two reversible electric motors for each of the two fender mounted rear view mirrors, four motor leads are required to provide for energization of the motors of each unit. These leads can be separate conductors taped together to form a cable, or they can comprise the leads of a multi-conductor cable such as can be readily obtained in the open market. In either event, each such cable is run down the bottom leg 77 of the tripod bracket 11 around the adjacent edge of the fender and into the adjacent wheel well, from which it is brought up through a hole 78 in the top wall of the wheel well. A plug connector 80 on the end of the cable is detachably engaged in a socket 82 secured to the top of the wheel well adjacent to the hole 78 or to any other conveniently handy structure in the engine compartment. The socket, of course, has the switch leads secured therein; the battery and ground connections to the switches, it is believed, will be apparent from FIG. 9.

The described plug and socket connection and the manner in which the motor leads are brought into the engine compartment where the switch leads are located, greatly facilitate installation and detachment of the rear view mirrors.

From the foregoing description, together with the accompanying drawings, it will be apparent to those skilled in the art that this invention provides an exceptionally simple and reliable remotely controlled fender mounted rear view mirror which is exceptionally well adapted for use on passenger cars and trucks towing wide trailers. It will also be evident that this invention eliminates the aggravating need for manually readjusting the rear view mirrors every time some well-meaning service station attendant cleans the mirrors and in doing so disturbs their setting.

Those skilled in the art will appreciate that the invention can be embodied in forms other than as herein disclosed for purposes of illustration.

The invention is defined by the following claims:

1. In combination with a rear view mirror and supporting structure therefor,
    A. means mounting the mirror on the supporting structure and constraining the mirror to tilting motion about each of two coordinate axes that are substantially parallel to the plane of the mirror;
    B. a pair of power driven actuators, each mounted on the supporting structure and each having a member rotatable about an axis which is fixed with respect to the supporting structure; and
    C. means for translating rotation of the rotatable member of each actuator into tilting adjustment of the mirror about one of said axes, the last mentioned means comprising
        1. a pair of pitmans, one for each actuator, each of said pitmans having a hole near each of its ends,
        2. means providing for each pitman a first connection of the pivot pin type which is rotatably received in one of said holes in the pitman and is secured to the rotatable member of the actuator for the pitman in eccentric parallel relation to the axis of that member, and
        3. means providing for each pitman a second connection of the pivot pin type which is rotatably received in the other of said holes in the pitman and is fixed to the mirror with its axis substantially parallel to the surface of the mirror and spaced from the axis about which it effects tilting adjustment, each pitman possessing sufficient torsional resilience and flexibility to accommodate itself to the changing orientation of the axes of the pivot pin type connections at the opposite ends of the pitman as the mirror is tiltingly adjusted.

2. The combination of claim 1 wherein the axes of all of said pivot pin type connections are parallel to the axes about which the rotatable members of the actuators rotate, when the mirror is in a neutral position.

3. The combination of claim 1 wherein each of said actuators has its said rotatable member located at one side thereof and spaced from the supporting structure, and wherein said first connection of the pivot pin type projects beyond said side of the actuator so that said member can rotate through a complete cycle without interference from the pitman or the supporting structure to permit repeated tilting of the mirror with a scanning action.

4. The combination of claim 1 wherein each of said actuators comprises an electric motor and means drivingly connecting the electric motor with the rotatable actuator for rotation of the latter at a speed substantially slower than that of the motor.

5. In combination with a mirror and supporting structure at its rear mounting the mirror for tilting adjustment about each of a pair of coordinate axes that are substantially parallel to the surfaces of the mirror:
   A. a pair of actuating members each mounted on the supporting structure for rotary motion about an axis fixed with respect thereto;
   B. an eccentric pin carried by each actuating member with its axis substantially parallel to that of the actuating member;
   C. a pair of pivot pins carried by the mirror at its rear with their axes parallel to the surfaces of the mirror, one of said mirror carried pins being located a distance to one side of one of said coordinate axes, and the other mirror carried pin being located a distance to one side of the other of said coordinate axes;
   D. a pair of pitmans each having one of its opposite ends pivotally connected to the eccentric pin on one of said actuating members and the other of its ends pivotally connected to one of said mirror carried pivot pins,
      said pivotal connections constraining relative motion between the pitmans and said actuators and the mirror to rotation about the axes of said pins; and
      said pitmans possessing sufficient torsional resilience and flexibility to accommodate themselves to the changing orientation of the axes of the eccentric pins on the actuating members and the pivot pins on the mirror, as the mirror is tiltingly adjusted.

6. The combination of claim 5, further characterized by:
   E. a backing plate secured flatwise to the rear of the mirror;
   F. a pair of spaced, opposing lugs on said backing plate, projecting forwardly therefrom;
   G. an intermediate gimbal element receivable between said opposing lugs;
   H. another pair of spaced, opposing lugs on said supporting structure between which the intermediate gimbal element is receivable;
   I. means providing a pivotal connection between the first mentioned pair of lugs and the intermediate gimbal element to provide for swinging of the mirror relative to said element about one axis parallel to the surfaces of the mirror; and
   J. means providing another pivotal connection between said other pair of lugs and the intermediate gimbal element, the last mentioned pivotal connection having its axis transverse to that of the first mentioned pivotal connection to provide for tilting adjustment of the mirror about both of said coordinate axes.

7. The combination of claim 6 further characterized by:
   K. a second pair of rearwardly projecting lugs on said backing plate, each spaced from the first mentioned pair of lugs and adjacent to one of said coordinate axes, each of the lugs of said second pair having one of said pivot pins anchored thereto.

8. The combination of claim 6 wherein said eccentric pins and said pivot pins pass through holes in the end portions of the pitmans, and wherein there are opposing surfaces normal to and fixed with respect to said pins at opposite sides of the pitmans; and further characterized by spring washers on said pins reacting between said opposing surfaces and bearing against the adjacent end portions of the pitmans.

9. In combination with a mirror and a supporting frame at the rear of the mirror:
   A. cooperating means on the rear of the mirror and on the frame mounting the mirror for sidewise tilting adjustment about an upright tilting axis and for up and down tilting adjustment about a substantially horizontal tilting axis, said cooperating means constraining the adjustment of the mirror to tilting about said two axes;
   B. a pair of power drive units each comprising an electric motor, a gear housing containing reduction gearing driven by the motor, and an actuating member which is drivingly connected with the motor through said reduction gearing to rotate on a fixed axis, said actuating member comprising a pivot pin eccentric to said fixed axis and having its axis parallel thereto;
   C. means mounting said power drive units on the frame with their actuating members spaced from one another in the direction of at least one of said tilting axes and with each so oriented that the axis about which its actuating member rotates lies in a plane substantially parallel to both of said tilting axes;
   D. connecting means fixed on the rear of the mirror comprising a pair of further pivot pins, one for each of said power drive units, each spaced from one tilting axis and located substantially on the other tilting axis and each having an axis generally parallel to the axis of the pivot pin of its power drive unit; and
   E. a pair of pitmans, each connecting the actuating member of a power drive unit with its further pivot pin on the mirror,
      each of said pitmans having a hole near each of its ends in which one of said pivot pins is rotatably received; and
   F. each pitman possessing sufficient torsional resilience and flexibility to accommodate itself to the changing orientation of the axes of the pivot pins on the actuating members with respect to the axes of the pivot pins on the mirror, as the mirror is tiltingly adjusted.

10. The combination of claim 9, further characterized by said frame having portions defining spaced top and bottom shelves upon which said gear housings are seated and to which they are secured.

11. In combination with a rear view mirror and supporting structure therefor,
   A. means mounting the mirror on the supporting structure and constraining the mirror to tilting motion about each of two coordinate axes;
   B. a pair of remotely controllable drive units mounted on the supporting structure;
   C. means forming a crank and pitman driving connection between each drive unit and the mirror, the connections of the pitmans to their respective cranks and to the mirror providing for relative motion therebetween and the connections of the pitmans to the mirror being so located with respect to the coordinate axes about which the mirror tilts that operation of one of said drive units effects tilting adjustment of the mirror about one of said axes and operation of the other drive unit effects tilting adjustment of the mirror about the other of said axes;

D. means constraining said relative motion at the connections of each pitman to its crank and to the mirror to rotation about an axis; and E. each pitman being a strip-like member, the minor transverse dimension of which at each end of the pitman being parallel to the axis of said relative rotary motion at the connections of the pitman to its crank and to the mirror, and each pitman having sufficient resilient flexibility to enable whatever distortion thereof is necessary to accommodate the changing relative orientation of the axes of relative rotary motion at the connections between the pitman and its crank and between the pitman and the mirror as the mirror is tiltingly adjusted with respect to the supporting structure.

12. The combination of claim 11 wherein said means for constraining said relative motion at the connections of each pitman to its respective crank and to the mirror comprises a stressed spring washer reacting between the pitman and surfaces fixed with respect to the crank and the mirror.

13. The combination of claim 4 further characterized by switch means located remote from said motors but electrically connected therewith so that upon proper actuation of the switch means said motors may be selectively connected with a source of emf.

14. The combination of claim 13, wherein said motors are reversible.

15. The combination of claim 14, wherein each of said motors effects repeated tilting of the mirror with a scanning action about the associated one of said coordinate axes as long as the motor remains energized, in consequence of continued rotation in one direction of the actuating member driven by said motor.

16. The combination of claim 4 wherein each rotatable member and its respective motor are mounted on the supporting structure by means of a gear housing containing reduction gearing through which the motor drives the actuating member; and wherein the motors and the gear housings are sealed and weathertight so that no other structure is required to protect the motors or the reduction gearing in the gear housings from the weather.

17. The combination of claim 16 further characterized by a pan-like housing mounted on the supporting structure with the mirror located in the open side of the pan-like housing and having its edges spaced from the adjacent walls of the housing so that the housing does not interfere with tilting adjustment of the mirror, the two actuators and the pitman connections between their rotatable members and the mirror, being located in the housing between the mirror and the bottom of the pan-like housing so as to be concealed from view.

18. The combination of claim 5, further characterized by means drivingly connected with said actuating members to provide for the transmission of rotary motion thereto independently of one another.

19. The combination of claim 18, wherein said last named means comprises individual reversible electric motors, one for each actuating member; and control means by which said motors can be energized from a remote location.

20. The combination of claim 5, wherein said actuating members are mounted for rotation on parallel axes which are normal to one of said coordinate axes.

* * * * *